(12) United States Patent
Zhou et al.

(10) Patent No.: US 7,274,757 B1
(45) Date of Patent: Sep. 25, 2007

(54) AUTOCORRELATION THRESHOLD GENERATION BASED ON MEDIAN FILTERING FOR SYMBOL BOUNDARY DETECTION IN AN OFDM RECEIVER

(75) Inventors: Xu Zhou, Sunnyvale, CA (US); Chien-Meen Hwang, San Jose, CA (US); Christine Lee, Irvine, CA (US); Ping Hou, San Carlos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 617 days.

(21) Appl. No.: 10/816,876

(22) Filed: Apr. 5, 2004

(51) Int. Cl.
    *H03D 1/00* (2006.01)
(52) U.S. Cl. .................. 375/340; 375/343; 375/344
(58) Field of Classification Search .............. 375/340, 375/342, 344
    See application file for complete search history.

(56) References Cited

U.S. PATENT DOCUMENTS

| | | | |
|---|---|---|---|
| 5,991,289 A * | 11/1999 | Huang et al. ............... | 370/350 |
| 7,054,393 B2 * | 5/2006 | Golanbari et al. .......... | 375/343 |
| 2002/0065047 A1 * | 5/2002 | Moose ....................... | 455/63 |
| 2003/0099314 A1 * | 5/2003 | Gummadi et al. ......... | 375/343 |
| 2004/0052319 A1 * | 3/2004 | Wakamatsu ................ | 375/343 |
| 2006/0146962 A1 * | 7/2006 | Troya et al. ................ | 375/340 |

OTHER PUBLICATIONS

Wang, "FPGA implementation of an OFDM-WLAN synchronizer", Second IEEE International Workshop on Electronic Design, Test and Applications, 2004. DELTA 2004, Jan. 28-30, 2004, pp. 89-94.*

Supplement to IEEE Standard for Information technology—Telecommunications and information exchange between systems—Local and metropolitan area networks—Specific requirements, "Part 11: Wireless LAN Medium Access Control (MAC) and Physical Layer (PHY) specifications: High-speed Physical Layer in the 5 GHZ Band", Sep. 16, 1999, pp. 1-82, Institute of Electrical and Electronics Engineers, Inc., New York, NY.

* cited by examiner

*Primary Examiner*—Temesghen Ghebretinsae
*Assistant Examiner*—Juan Alberto Torres
(74) *Attorney, Agent, or Firm*—Manelli Denison & Selter PLLC; Leon R. Turkevich

(57) ABSTRACT

An OFDM receiver has an autocorrelation circuit configured for generating autocorrelated power values from samples of received short preamble symbols in a received data packet, and a median filter configured for generating a median autocorrelation value from at least a prescribed minimum number of the autocorrelated signal values. A comparator is configured for detecting a symbol boundary, identifying an end of the short preamble symbols, based on the autocorrelated signal values falling below a threshold that is based on the median autocorrelation value. Hence, the threshold used to identify the symbol boundary is dynamically calculated on a per-packet basis, eliminating errors due to varying energy levels or propagation characteristics from different packet sources; moreover, the median autocorrelation value minimizes effects due to noise components, minimizing false detection errors.

10 Claims, 4 Drawing Sheets

AUTOCORRELATION THRESHOLD GENERATION BASED ON MEDIAN FILTERING FOR SYMBOL BOUNDARY DETECTION IN AN OFDM RECEIVER

BACKGROUND OF THE INVENTION

1. Field of the Invention

The present invention relates to symbol boundary detection in an IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11a based OFDM PHY in hardware involves providing a cost-effective, compact device that can be implemented in smaller wireless devices. Hence, implementation concerns typically involve cost, device size, and device complexity.

FIG. 1 is a diagram of a preamble 10 used by an OFDM receiver for synchronization with an 802.11 OFDM packet 12, reproduced from FIG. 110 (Section 17.3.3) of the IEEE Standard 802.11a. In particular, the preamble 10 is a Physical Layer Convergence Procedure (PLCP) preamble having a first training portion (i.e., a short preamble) 14 and a second training portion (i.e., a long preamble) 16. The first training portion 14, typically used for signal detection, automatic gain control, diversity selection, coarse frequency offset estimation, and timing synchronization, includes ten (10) identical short preamble symbols ($t_1, t_2, \ldots t_{10}$) 18; each short preamble symbol 18 is implemented as a 16-sample symbol. The second training portion 16 includes long training symbols ($T_1$ and $T_2$) 20 and a guard interval (GI2) 22. The second training portion 16 typically is used for channel and fine frequency offset estimation.

A particular concern involves accurate detection of the symbol boundary 24 by the OFDM receiver. Accurate detection of the symbol boundary 24 is critical for accurate Fast Fourier Transform (FFT) processing of the long training symbols 20 and subsequent symbols 26 following the preamble 10. One technique for detecting the symbol boundary 24 is to perform autocorrelation of the short preamble symbols 18 for generation of an autocorrelation power signal: since the short preamble symbols 18 should be identical, the resulting autocorrelation power signal should have a maximum value until the end of the first training portion 14, at which point the autocorrelation power signal drops after no further short preamble symbols are detected after the last symbol ($t_{10}$).

Hence, the symbol boundary 24 typically can be detected by supplying the autocorrelation power signal to an edge detection circuit which can detect the symbol boundary 24 in response to detecting the falling edge of the autocorrelation power signal passing below a set threshold.

However, an arbitrary setting for the threshold may greatly affect the accuracy of the symbol boundary detection. In particular, each received packet may originate from a different wireless source; hence, the energy in each received packet may vary; moreover, each received packet may have encountered different wireless channel characteristics (e.g., fading), and hence have different noise characteristics. Consequently, the energy and noise characteristics will vary with each packet, affecting the time in which the corresponding autocorrelation power signal will pass below the set threshold.

SUMMARY OF THE INVENTION

There is a need for an arrangement that enables a direct conversion receiver to accurately and precisely detect a symbol boundary between a short preamble and a long preamble of a received wireless packet, despite per-packet variations in channel fading and noise components.

These and other needs are attained by the present invention, where an OFDM receiver has an autocorrelation circuit configured for generating autocorrelated power values from received short preamble symbols in a received data packet, and a median filter configured for generating a median autocorrelation value from at least a prescribed minimum number of the autocorrelated signal values. A comparator is configured for detecting a symbol boundary, identifying an end of the short preamble symbols, based on the autocorrelated signal values falling below a threshold that is based on the median autocorrelation value. Hence, the threshold used to identify the symbol boundary is dynamically calculated on a per-packet basis, eliminating errors due to varying energy levels or propagation characteristics from different packet sources; moreover, the median autocorrelation value minimizes effects due to noise components, minimizing false detection errors.

One aspect of the present invention provides a method in an OFDM direct conversion receiver. The method includes receiving OFDM symbols, including an initial minimum number of short preamble symbols. The method also includes generating autocorrelated signal values from respective consecutive pairs of OFDM symbols, and generating a median autocorrelation value from at least a prescribed minimum number of the autocorrelated signal values having been generated from the initial minimum number of short preamble symbols. The method also includes detecting a symbol boundary, identifying an end of the short preamble symbols, based on detecting the autocorrelated signal values having passed below a threshold that is based on the median autocorrelation value.

Another aspect of the present invention provides an OFDM direct conversion receiver including a correlator, a median filter, and a detector. The correlator is configured for receiving OFDM symbols, including an initial minimum number of short preamble symbols, and generating autocorrelated signal values based on samples from consecutive OFDM symbols. The median filter is configured for generating a median autocorrelation value from at least a prescribed minimum number of the autocorrelated signal values. The detector is configured for detecting a symbol boundary, identifying an end of the short preamble symbols, based on detecting the autocorrelated signal values having passed below a threshold that is based on the median autocorrelation value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11a OFDM transceiver, followed by a detailed description of the generation of an autocorrelation threshold based on median filtering, according to an embodiment of the present invention.

Receiver Architecture Overview

Figure 2:
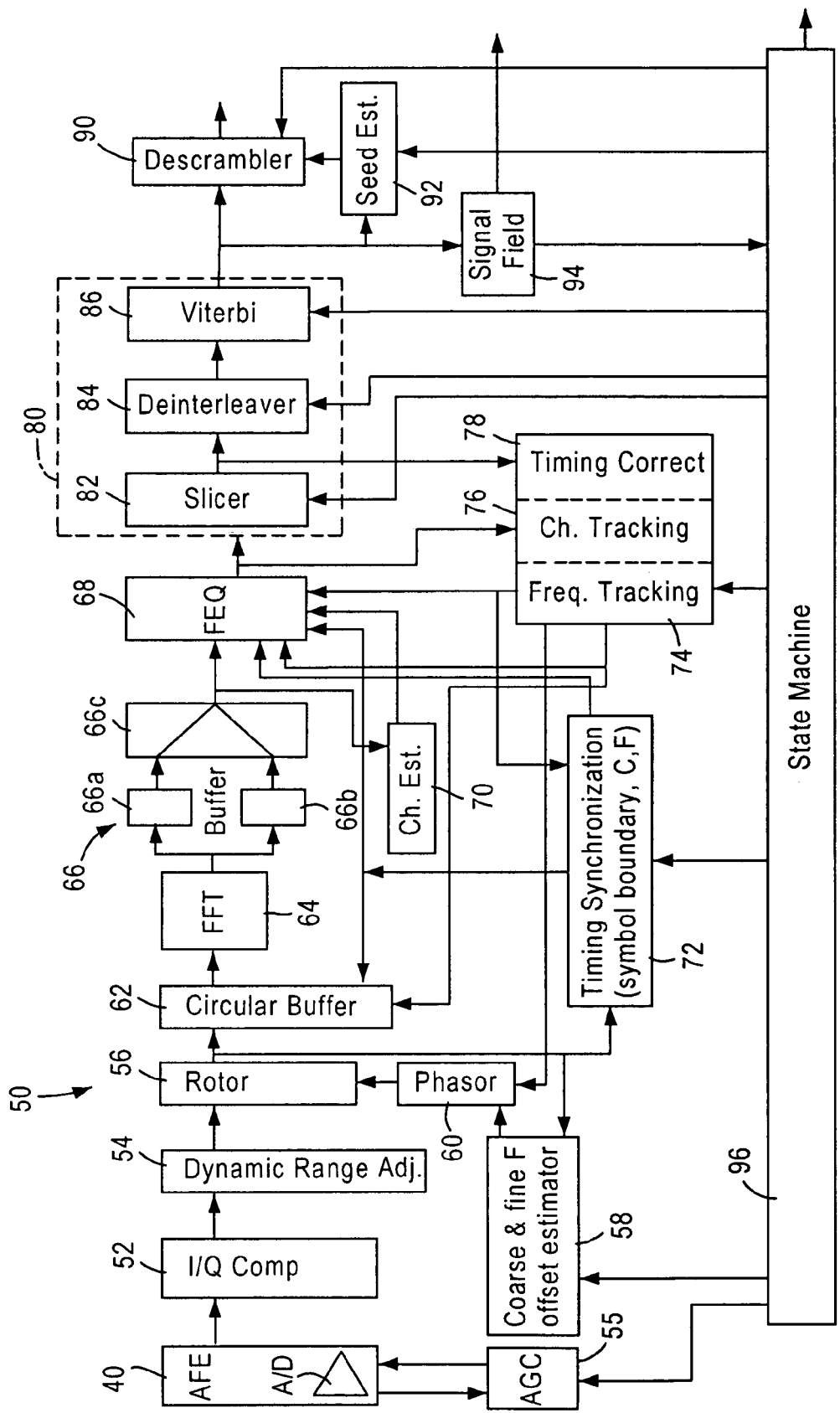
FIG. 2 is a diagram illustrating the receiver portion of an IEEE 802.11a OFDM transceiver according to an embodiment of the present invention.

FIG. 2 is a diagram illustrating an architecture of a receiver module 50 of an IEEE 802.11a Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module 52 is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11a preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11a specification.

The descrambler circuit 90 is configured for recovering the original serial bit stream from the decoded data, by descrambling a 127-bit sequence generated by the scrambler of the transmitter, according to the IEEE 802.11a specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11a compliant Media Access Controller (MAC).

Autocorrelation Threshold Generation Based on Median Filtering

Figure 1:
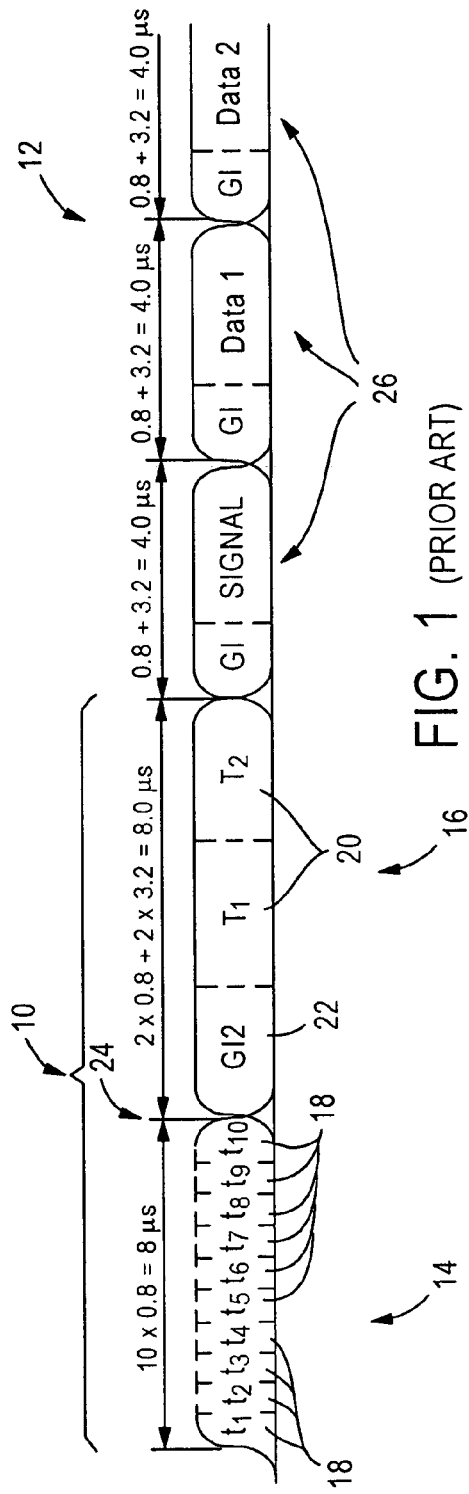
FIG. 1 is a diagram illustrating a (PRIOR ART) preamble of a packet according to the IEEE 802.11a specification.
Figure 3:
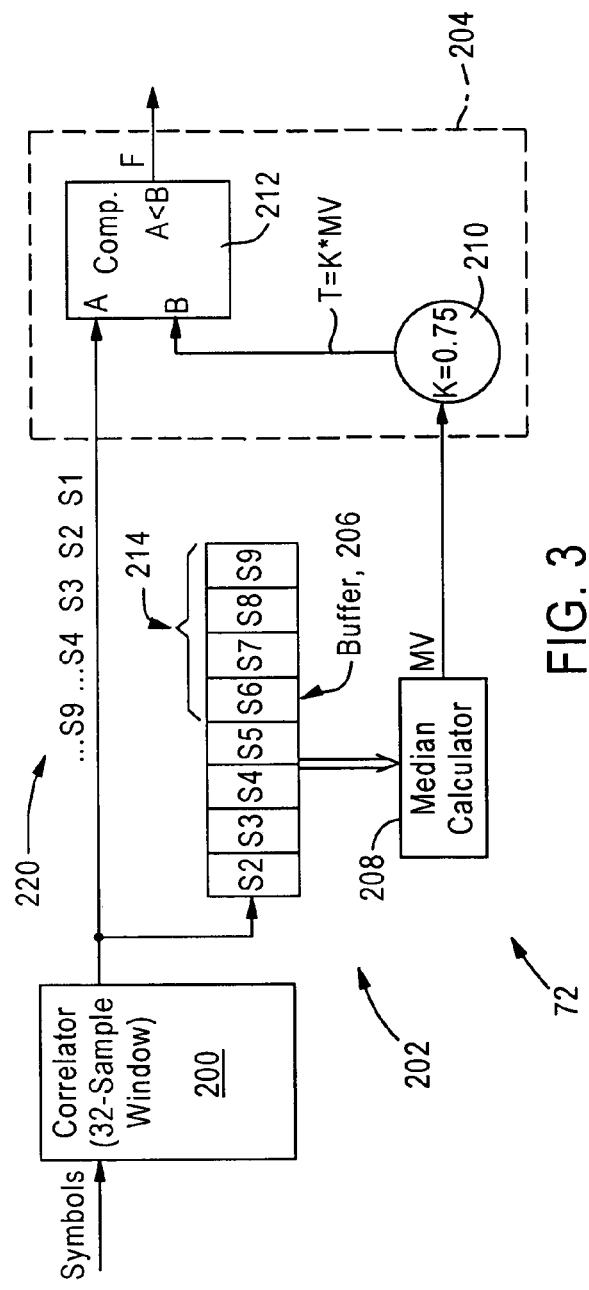
FIG. 3 is a block diagram illustrating in detail the timing synchronization module of FIG. 2, according to an embodiment of the present invention.

FIG. 3 is a block diagram illustrating the timing synchronization module 72 according to an embodiment of the present invention. The timing synchronization module 72 includes a correlator 200 configured for receiving OFDM symbols 18, 20, 26 and generating autocorrelated signal values (S1, S2, etc.) 220 from samples of consecutive OFDM symbols. The correlator 200 is configured for generating a new autocorrelated signal value (i.e., correlation output) 220 for each preamble sample received. For example, assume the correlation output S(n) (e.g. S(n)=S1) is calculated based on samples 0-15 of the short preamble symbol "$t_1$" 18 and samples 0-15 of the short preamble "$t_2$" 18. In this case, the next correlation output S(n+1)(e.g., S(n+1)=S2) is generated by moving the 32-sample correlation window of the correlator 200 one sample forward, thereby using samples 1-15 of the short preamble symbol "$t_1$" 18, samples 0-15 of the short preamble symbol "$t_2$" 18, and sample 0 of the short preamble symbol "$t_3$" 18. Since the short preamble symbols 18 are repetitive, the sample 0 of symbol "$t_3$" is essentially the same as sample 0 of symbol "$t_1$" (aside from noise variations); hence, the correlation outputs S(n+1), S(n+2) (e.g., S(n+2)=S3), S(n+3) (e.g., S(n+3)=S4), etc. should have the same power as S(n).

Since the short training symbols 18 are substantially identical (subject to noise variations), the autocorrelated signal values S1, S2, S3, . . . S9, etc. (up to about S128) generated from the short training symbols 18 should have substantially the same relative maximum value. Since the short training symbol $t_{10}$ 18 and the long training symbol $T_1$ 20 are substantially different, however, the resulting autocorrelated signal value generated based on a sample from the long training symbol $T_1$ 20 is substantially lower than the prior autocorrelated signal values (e.g., S1 through about S128).

According to the disclosed embodiment, the timing synchronization module 72 includes a median filter 202 and a detector 204. The median filter 202 is configured for generating a median autocorrelation value (MV) from at least a minimum number 214 of the autocorrelated signal values (illustrated as S2 . . . S9) having been generated from the short preamble symbols 18. In particular, the median filter 202 includes a buffer 206 configured for storing at least a prescribed number of the first autocorrelated signal values (S1 through S9), preferably at least a minimum 214 of the first four (4) autocorrelated signal values output by the autocorrelator 200 for a received packet. Since there is uncertainty as to whether the first short training symbol $t_1$ will detected due to wireless channel characteristics, the median filter 202 should use up to the first seven entries stored in the buffer 206 to ensure distortion is not introduced in the event that the autocorrelated signal value generated based on a signal sample of the long training symbol $T_1$ is stored in the buffer 206.

The median filter 202 also includes a median calculator 208 configured for determining the median value (MV) of the autocorrelated signal values (S2 through S9) stored in the buffer 206. Hence, the calculation of the median value (MV) from the autocorrelated signal values stored in the buffer 206 minimizes the effects of noise in the short training symbols 18, particularly in cases where low signal-to-noise conditions are encountered, by providing a "smoothing function" across the autocorrelated signal values generated from the short preamble symbols 18. Hence, the median value of the correlation power provides a more noise-resistant value than using the average of the autocorrelated signal values.

The median calculator 208 also updates its buffer 206 for each correlation output 220 by shifting out (i.e., discarding) the oldest stored entry (e.g., S1) from the buffer 206, and shifting in (i.e., adding) the new entry (e.g., S9) 220 into the buffer 206. The median calculator then calculates the median value (MV) based on the updated buffer 206.

The detector 204 includes a multiplier 210 and a comparator 212. The multiplier 210 is configured for generating a threshold (T) based on multiplying the median autocorrelation value (MV) by a prescribed constant value (K), where T=K*MV. The constant value (K) is based on the expected drop, relative to the median value MV, of the autocorrelated signal value based on the difference between the short training symbol $t_{10}$ 18 and the long training symbol $T_1$ 20.

The threshold T is supplied to the comparator 212. The comparator 212 is configured for outputting a detection signal flag (F) in response to the supplied autocorrelated signal value 220 passing below the threshold T.

Note that the buffer 206 illustrated in FIG. 3 may be configured to store a maximum of eight (8) autocorrelated signal values to minimize the probability that later autocorrelated signal values adversely affect the calculation of the median value (MV), in the event the first few short training symbols (e.g., $t_1$ and $t_2$) are not detected.

According to the disclosed embodiment, a median filter outputs a median autocorrelation value, where adverse effects due to noise components in the short training symbols are removed, enabling improved accuracy in detecting the symbol boundary 24, and minimizing false detections otherwise caused by noise.

Smart Decision in Slicer to Solve Sensitivity to Boundary Conditions

The following description is an improvement in the slicer 82 of FIG. 2. In particular, noise will cause the slicer 82 to make the wrong hard-decision when data falls within boundary conditions.

Hence, the following solution is proposed: define a boundary region (e.g., $B_1$ to $B_2$) for each modulation scheme. If the input data falls within this range, the slicer 82 needs to indicate that the hard decision output might be and will most likely be wrong. In summary, the slicer 82 needs to perform this test and associate a confidence factor ("weight") with each hard decision output that it makes. If the input falls within the predefined boundaries, this factor will indicate that the confidence factor is very low. In other words, if the input is within the boundary region (e.g., $B_1$ to $B_2$), the hard decision output is assigned a weight value of 1; if the input is not within the boundary region, the hard decision output is assigned a weight value of zero.

Pre-Stored Short Preamble Sequences to Reduce IEEE 802.11 Packet Transmit Initial Latency The following description is intended to solve the following problem in transmitters: to send the IEEE 802.11a defined physical layer packet, a fixed considerable amount of initial computation time is needed; this time may in term consume timing budgets for other higher layer protocols.

Figure 4:
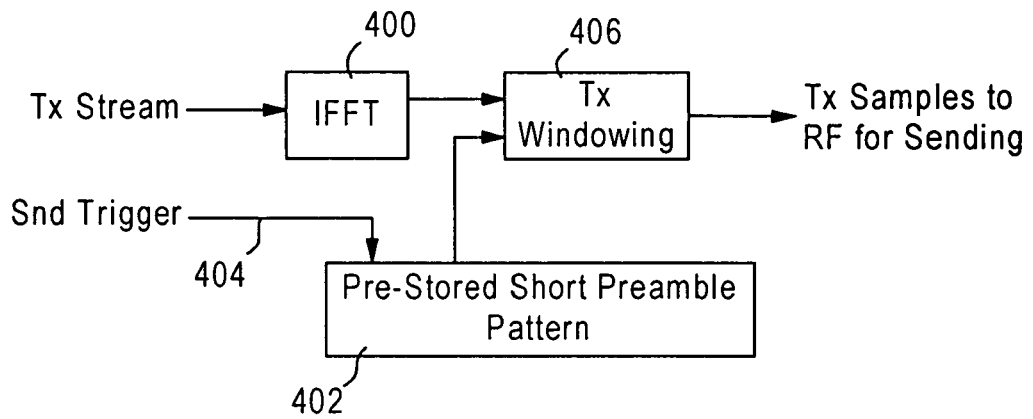
FIG. 4 is a diagram illustrating an arrangement for pre-stored short preamble patterns in a transmitter.

FIG. 4 illustrates a solution to this problem: (1) precalculate the short-preamble pattern after IFFT operations by an IFFT module 400 and save the short preamble pattern in a sixteen (16) entry ROM 402; (2) upon receiving the Tx send trigger 404, the pre-stored short preamble pattern can be sent over the media immediately (repeated use for 4 times) via a transmitter windowing block 406, while the other part of the transmit packet data is undergoing normal IFFT (OFDM) processing.

Adaptive Threshold for Packet Detection

This description addresses the following problem in the dynamic range adjust 54: if the threshold is not set properly, the probability of false detection or misdetection could be high.

OFDM signals behave very much like noise for a wireless LAN. The receiver needs to cope with a very large dynamic range. If the threshold is set too low, there will be too many false detections; if it is set too high, then there could be a mis-detection.

Figure 5:
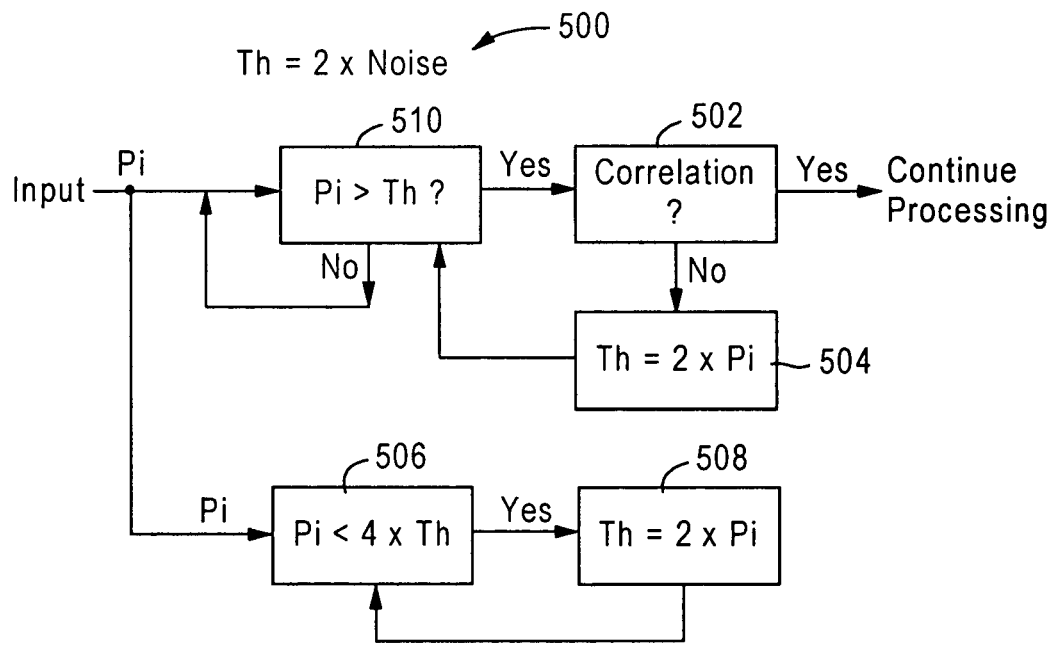
FIG. 5 is a diagram illustrating adaptive threshold for packet detection.

FIG. 5 illustrates that to solve this problem, the initial threshold to about twice the noise level in step 500. If upon correlation no signal is detected in step 502, the threshold is raised to twice the average signal Pi in step 504.

On the other end of the spectrum, when in step 506 the average signal drops too far below the threshold, it might indicate that the packet is ending, hence we drop the threshold down in step 508 so that we don't miss a new incoming packet in step 510.

Optimal Receiver Recovery when the Signal is Lost Before the Full Packet is Received This description addresses the following problem: the receiver is supposed to wait for the full time window of the decoded packet length. However, if the packet length was decoded incorrectly or if the signal was lost during the middle of the packet, then the receiver will be wasting time up until the supposed "end time" of the packet.

Figure 6:
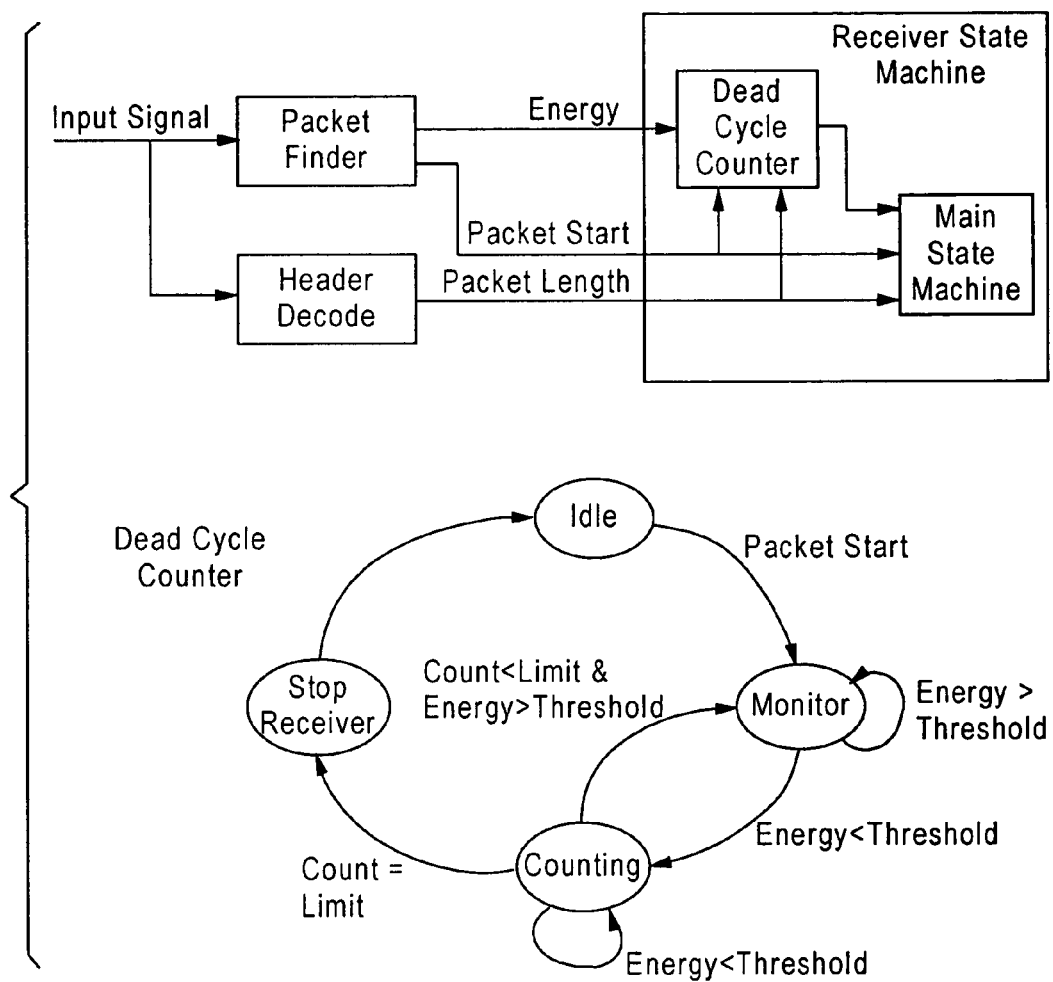
FIG. 6 is a diagram illustrating receiver recovery following loss of packet data.

As illustrated in FIG. 6, by using the same signal energy detection scheme used for the initial packet detection described above, the receiver state machine 96 can be designed to reset itself after a certain number of cycles where the signal energy drops below a predefined threshold.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM direct conversion receiver, the method including:
   receiving OFDM symbols, including an initial minimum number of short preamble symbols;
   first generating autocorrelated signal values based on successively autocorrelating consecutive samples from consecutive OFDM symbols, each of the short preamble symbols having a first prescribed number of samples and each autocorrelated signal value generated based on autocorrelating a second number of adjacent samples, the second number twice the first prescribed number;
   second generating a median autocorrelation value from at least a prescribed minimum number of the autocorrelated signal values having been generated from the initial minimum number of short preamble symbols; and
   detecting a symbol boundary, identifying an end of the short preamble symbols, based on detecting the autocorrelated signal values having passed below a threshold that is based on the median autocorrelation value.

2. The method of claim 1, wherein each of the short preamble symbols have sixteen (16) samples as the first prescribed number, the step of first generating each autocorrelated signal value includes autocorrelating thirty-two (32) adjacent samples as the second number, and outputting a power value as the corresponding autocorrelated signal value.

3. The method of claim 1, wherein the second generating step includes:
   storing at least the prescribed minimum number of the autocorrelated signal values in a buffer; and
   determining a median of the stored autocorrelated signal values as the median autocorrelation value.

4. The method of claim 3, further comprising generating the threshold by multiplying the median autocorrelation value by a prescribed constant value.

5. The method of claim 4, wherein the detecting step includes supplying the threshold and the autocorrelated signal values to a comparator, the comparator outputting a detection signal representing detection of the symbol boundary in response to the autocorrelated signal values passing below the threshold.

6. An OFDM direct conversion receiver including:
a correlator configured for receiving OFDM symbols, including an initial minimum number of short preamble symbols, and generating autocorrelated signal values based on successively autocorrelating consecutive samples from consecutive OFDM symbols, each of the short preamble symbols having a first prescribed number of samples and each autocorrelated signal value generated based on the correlator autocorrelating a second number of adjacent samples, the second number twice the first prescribed number;
a median filter configured for generating a median autocorrelation value from at least a prescribed minimum number of the autocorrelated signal values having been generated from the initial minimum number of short preamble symbols; and
a detector configured for detecting a symbol boundary, identifying an end of the short preamble symbols, based on detecting the autocorrelated signal values having passed below a threshold that is based on the median autocorrelation value.

7. The receiver of claim 6, wherein each of the short preamble symbols have sixteen (16) samples as the first prescribed number, the correlator configured for generating each autocorrelated signal value by autocorrelating thirty-two (32) adjacent samples as the second number, and outputting a power value as the corresponding autocorrelated signal value.

8. The receiver of claim 6, wherein the median filter includes:
a buffer configured for storing at least the prescribed minimum number of the autocorrelated signal values; and
a median calculator configured for determining a median of the stored autocorrelated signal values as the median autocorrelation value.

9. The receiver of claim 8, wherein the detector is configured for generating the threshold by multiplying the median autocorrelation value by a prescribed constant value.

10. The method of claim 9, wherein the detector includes a comparator configured for outputting a detection signal, representing detection of the symbol boundary, in response to the autocorrelated signal values passing below the threshold.

* * * * *